United States Patent
Iyer et al.

(10) Patent No.: US 9,104,793 B2
(45) Date of Patent: Aug. 11, 2015

(54) METHOD AND SYSTEM OF ADAPTING COMMUNICATION LINKS TO LINK CONDITIONS ON A PLATFORM

(75) Inventors: Venkatraman Iyer, Austin, TX (US); Arvind Kumar, Brookline, MA (US); Santanu Chaudhuri, Mountain View, CA (US); Darren S. Jue, Sunnyvale, CA (US); Dennis R. Halicki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1357 days.

(21) Appl. No.: 12/890,252

(22) Filed: Sep. 24, 2010

(65) Prior Publication Data

US 2012/0079160 A1    Mar. 29, 2012

(51) Int. Cl.
| | | |
|---|---|---|
| G06F 13/40 | (2006.01) | |
| G06F 13/36 | (2006.01) | |
| H04L 12/40 | (2006.01) | |
| G06F 13/42 | (2006.01) | |
| H04L 12/00 | (2006.01) | |

(52) U.S. Cl.
CPC ............ G06F 13/36 (2013.01); G06F 13/4072 (2013.01); G06F 13/4291 (2013.01); H04L 12/00 (2013.01); H04L 12/4013 (2013.01); H04L 12/40052 (2013.01); H04L 12/40136 (2013.01)

(58) Field of Classification Search
CPC ............... G06F 13/40; G06F 13/4072; H04L 12/40052; H04L 12/4013; H04L 12/40136
USPC ........................................ 710/106, 305, 313
See application file for complete search history.

(56) References Cited

U.S. PATENT DOCUMENTS

| | | | | |
|---|---|---|---|---|
| 7,787,370 | B1* | 8/2010 | Aweya et al. ................. | 370/230 |
| 8,599,913 | B1* | 12/2013 | Brown et al. ................. | 375/232 |
| 2002/0048276 | A1* | 4/2002 | Kauppinen et al. ........... | 370/410 |
| 2004/0111541 | A1* | 6/2004 | Meyer et al. .................... | 710/52 |
| 2004/0268190 | A1* | 12/2004 | Kossel et al. ................. | 714/704 |
| 2006/0164072 | A1* | 7/2006 | Ng et al. .................... | 324/158.1 |
| 2006/0233201 | A1* | 10/2006 | Wiesenthal ................... | 370/477 |

(Continued)

FOREIGN PATENT DOCUMENTS

| | | |
|---|---|---|
| CN | 1890652 A | 1/2007 |
| CN | 101465803 A | 6/2009 |
| CN | 103109507 | 5/2013 |

OTHER PUBLICATIONS

International Preliminary Report on Patentability for PCT Patent Application No. PCT/US2011/053137, Mailed Apr. 4, 2013, 7 Pages.

(Continued)

*Primary Examiner* — Glenn A Auve
(74) *Attorney, Agent, or Firm* — International IP Law Group, P.L.L.C.

(57) ABSTRACT

A method and system to adapt communication links statically and/or dynamically to their individual link conditions on a platform. The communicatively coupled devices have logic to adapt one or more settings of a respective one or more communication links with another device based at least in part on a respective metric of received data patterns from the respective one or more communication links. The communicatively coupled devices in the platform have a back channel to allow feedback or information to be sent from one receiving device to a transmitting device in one embodiment of the invention.

20 Claims, 6 Drawing Sheets

(56) References Cited

U.S. PATENT DOCUMENTS

| | | | |
|---|---|---|---|
| 2006/0256747 A1* | 11/2006 | Jaakkola | 370/328 |
| 2007/0011536 A1* | 1/2007 | Khanna et al. | 714/733 |
| 2008/0043773 A1* | 2/2008 | Ihori | 370/460 |
| 2008/0080603 A1* | 4/2008 | Bunce et al. | 375/224 |
| 2011/0206141 A1* | 8/2011 | Barrett et al. | 375/259 |
| 2012/0005394 A1* | 1/2012 | Goodart et al. | 710/313 |
| 2013/0046908 A1* | 2/2013 | Dunstan et al. | 710/104 |
| 2013/0064122 A1* | 3/2013 | Hammarwall et al. | 370/252 |

OTHER PUBLICATIONS

"An Introduction to the Intel QuickPath Interconnect", Intel Corporation, (Jan. 2009), pp. 1-22.

Office Action from corresponding Chinese Application No. 201180046141.1, Mailed Nov. 4, 2014; Translation is 9 pages, Original Office Action is 6 Pages.

* cited by examiner

FIG. 5

METHOD AND SYSTEM OF ADAPTING COMMUNICATION LINKS TO LINK CONDITIONS ON A PLATFORM

FIELD OF THE INVENTION

This invention relates to communication links, and more specifically but not exclusively, to a method and system to facilitate adaptation of each communication link statically and/or dynamically to the link condition of each communication link on a platform.

BACKGROUND DESCRIPTION

Devices or agents often communicate using one or more communication links or lanes at very high data rates. The settings of a transmitting device and a receiving device to achieve maximum margin are often pre-determined by using a software simulation of the characteristics of the platform or the board.

However, the actual characteristics of each communication lane on a specific board may vary significantly from the model used in the software simulation. This may cause the settings of the transmitting device and the receiving device to be sub-optimal for the communication links. When a single and common setting for the transmitting device and the receiving device is used, significant lane-to-lane variations may also cause the communication links to be sub-optimal.

BRIEF DESCRIPTION OF THE DRAWINGS

The features and advantages of embodiments of the invention will become apparent from the following detailed description of the subject matter in which:

FIG. 5 illustrates a sequence of an adaptation operation in accordance with one embodiment of the invention;

DETAILED DESCRIPTION

Figure 1:
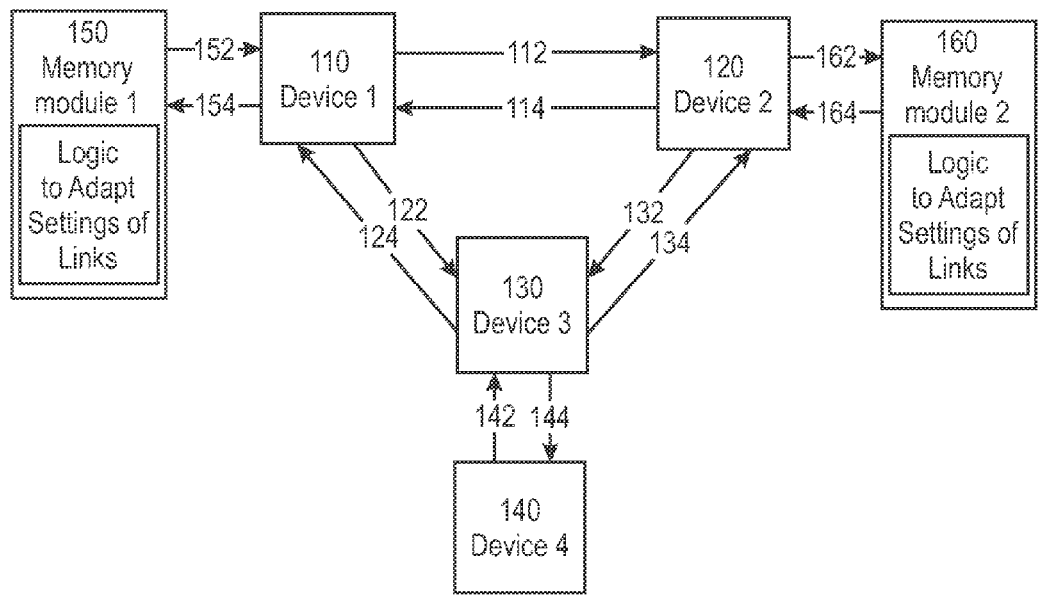
FIG. 1 illustrates a block diagram of a platform in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide methods and systems to adapt communication links statically and/or dynamically to their individual link conditions on a platform. A device in the platform uses communication links that include, but is not limited to, serial, parallel, half-duplex, and full-duplex communication links and the like. In one embodiment of the invention, the device has logic to adapt one or more settings of a respective one or more communication links with another device based at least in part on a respective metric of received data patterns from the respective one or more communication links. The type of signals in the communication links include, but is not limited to, single-ended signals, low voltage differential signals (LVDS) and any other form of signals. The communication links are adapted all at the same time in one embodiment of the invention. In another embodiment of the invention, the communication links are adapted one at a time.

The criterion for a best metric includes, but is not limited to, voltage margin, timing margin, power dissipation, and any combination thereof, of one or more parameters of each communication lane in one embodiment of the invention. In another embodiment of the invention, the criterion for the best metric includes, but is not limited to, voltage margin, timing margin, power dissipation, and any combination thereof, of one or more parameters of any number of groups of communication lanes. One of ordinary skill in the relevant art will readily appreciate that any general criterion can be used to determine the best metric without affecting the workings of the invention.

The communicatively coupled devices in the platform have a back channel to allow feedback or information to be sent from one receiving device to a transmitting device in one embodiment of the invention. In one embodiment of the invention, the setting of the communication link includes, but is not limited to, termination adjustment, clock lane optimization, cross talk, equalizers at transmit or receive end, jitter, signal attenuation, reflective effect, signal propagation delay, duty cycle, power level, and any other parameter or characteristics of the communication link. In one embodiment of the invention, the adjustment of the setting(s) of the communication links is performed per lane, i.e., single lane granularity. In another embodiment of the invention, the adjustment of the setting(s) of the communication links is performed for multiple lanes, i.e., within the granularity of any sized group of lanes.

FIG. 1 illustrates a block diagram 100 of a platform in accordance with one embodiment of the invention. The platform includes, but is not limited to, a desktop computer, a laptop computer, a net book, a notebook computer, a personal digital assistant (PDA), a server, a workstation, a cellular telephone, a mobile computing device, an Internet appliance or any other type of computing device.

The platform 100 has device 1 110, device 2 120, device 3 130, device 4 140, memory module 1 150 and memory module 2 160 in one embodiment of the invention. The device 1 110 is coupled with the device 2 120 via the two communication links or lanes 112 and 114. The device 1 110 sends information to the device 120 via the communication link 112 and receives information from the device 120 via the communication link 114. The device 1 110 is also coupled with the device 3 130 via the two communication links 122 and 124 and the device 2 120 is coupled with the device 3 130 via the two communication links 132 and 134. The device 3 130 is also coupled with the device 4 140 via the two communication links 142 and 144.

The device 1 110 is coupled with a memory module 1 150 in one embodiment of the invention via the two communication links 152 and 154. Similarly, the device 2 120 is coupled with a memory module 2 160 in one embodiment of the invention via the two communication links 162 and 164. The device 1 110 and device 2 120 has an integrated memory host controller to communicate with the memory module 1 150 and the memory module 2 160 respectively in one embodiment of the invention.

The communication links 112, 114, 122, 124, 132, 134, 142, 144, 152, 154, 162, and 164 include, but are not limited to, data signal channels, clock signal channels, control signal channels, address signals and the like. In one embodiment of the invention, the direction or flow of the communication links 112, 114, 122, 124, 132, 134, 142, 144, 152, 154, 162, and 164 is programmable or configurable. For example, in one embodiment of the invention, one or more channels of the communication link 112 can be programmed to flow from the device 2 120 to the device 1 110. Similarly, one or more channels of the communication link 114 can be programmed to flow from the device 1 110 to the device 2 120.

In one embodiment of the invention, each of the devices 1-4 110, 120, 130, and 140, and the memory module 1-2 150 and 160 has logic to adapt one or more settings of their respective communication links with another device based at least in part on a respective metric of received data patterns from their respective communication links. For example, in one embodiment of the invention, the device 1 110 has the ability to adapt the transmission settings of the communication link 112 and/or the reception settings of the communication link 114 based on the link conditions of the platform 100. The device 1 110 may select one or more of the channels in the communication link 112 to be adapted to the individual link conditions of the selected channels. Similarly, the device 2 120 has the ability to adapt the transmission settings of the communication link 114 and/or the reception settings of the communication link 112 based on the link conditions of the platform 100 in one embodiment of the invention.

The device 1 110 and the device 2 120 have a back channel that facilitates communication in one embodiment of the invention. The back channel allows a receiving device to provide feedback to a transmitting device for the adaptation of the transmitting device. For example, in one embodiment of the invention, the device 2 120 receives one or more data patterns or packets from the device 1 110 during an adaptation operation of the device 1 110. The device 2 120 evaluates a metric or performance indicator of each of the data patterns and indicates to the device 1 110 which one of the data patterns received from the device 1 110 has the best metric by using the back channel. The term data pattern is used broadly to indicate not only the bit pattern but also the shape of the pattern which is a function of the electrical settings. In one embodiment, the same bit pattern could be used with different electrical settings to create a different data pattern.

The adaptation logic described for the device 1 110 and the device 2 120 are present in the device 3 130, the device 4 140 and the memory modules 1-2 150 and 160 in one embodiment of the invention. One of ordinary skill in the relevant will readily appreciate the workings of the adaptation logic in the device 3 130, the device 4 140 and the memory modules 1-2 150 and 160 and shall not be described herein.

In one embodiment of the invention, the communication links 112, 114, 122, 124, 132, 134, 142, 144, 152, 154, 162, and 164 operate at least in part with, but are not limited to, Intel® QuickPath Interconnect (QPI), Peripheral Component Interconnect (PCI) Express interface, Intel® Scalable Memory Interconnect (SMI) and the like. The devices 1-4 110, 120, 130, and 140 include, but are not limited to, processors, controllers, Input/Output (I/O) hubs, and the like. The memory modules 1-2 150 and 160 include, but are not limited to, a buffered memory module, and the like.

The configuration of the platform 100 serves as an illustration of one embodiment of the invention and is not meant to be limiting. One of ordinary skill in the relevant art will readily appreciate that other configurations of the platform 100 can be used without affecting the workings of the invention and the other configurations shall not be described herein. For example, in one embodiment of the invention, the platform 100 has one or more peripheral logic modules.

Figure 2:
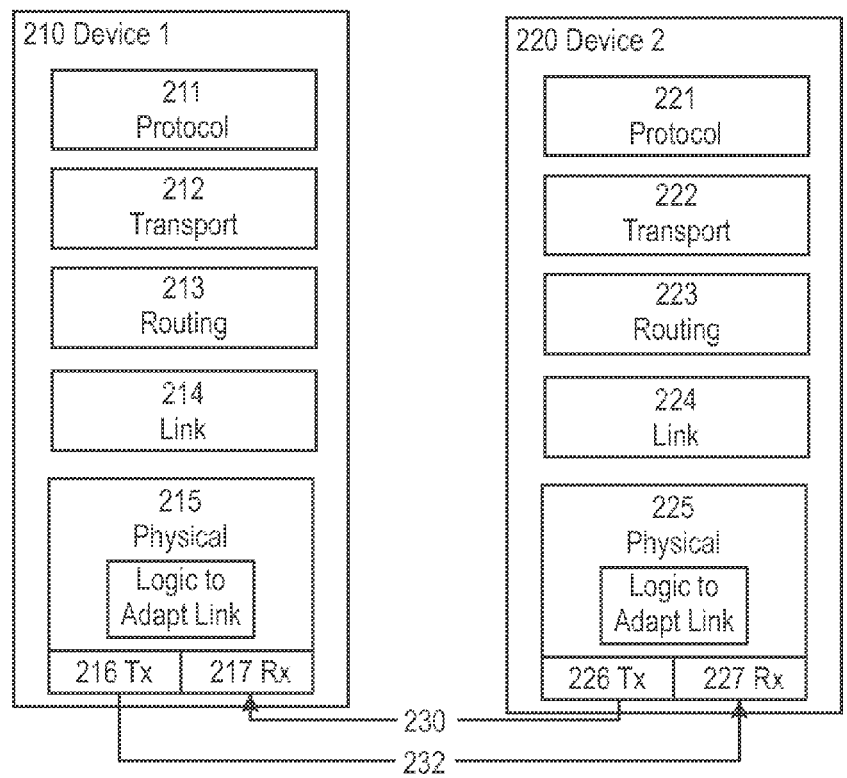
FIG. 2 illustrates the architectural layers of two communicatively coupled devices in accordance with one embodiment of the invention.

FIG. 2 illustrates the architectural layers 200 of two communicatively coupled devices or agents in accordance with one embodiment of the invention. For clarity of illustration, the architectural layers 200 are compliant at least in part with the Intel® QPI in one embodiment of the invention. The device 1 210 has a protocol layer 211, a transport layer 212, a routing layer 213, a link layer 214, and a physical layer 215. The device 2 220 similarly has a protocol layer 221, a transport layer 222, a routing layer 223, a link layer 224, and a physical layer 225. The device 1 210 sends information via the transmission (TX) logic 216 in the physical layer 215 to the receive (RX) logic 227 in the physical layer 225 of the device 2 220.

In one embodiment of the invention, the device 1 210 and the device 2 220 have logic in the physical layers 215 and 225 to facilitate the adaptation of the communication links 230 and 232 based on the link conditions of the platform. The adaptation of the communication links 230 and 232 is performed prior to the operational modes of the device 1 210 and the device 2 220 in one embodiment of the invention, i.e., static adaptation. In another embodiment of the invention, the adaptation of the communication links 230 and 232 is performed during the operational modes of the device 1 210 and the device 2 220, i.e., dynamic adaptation.

The communication links 230 and 232 between the physical layers 215 and 225 are wired in one embodiment of the invention. The wiring includes, but is not limited to, interconnect cables or wires, printed circuit board (PCB) electrical traces and the like. The communication links 230 and 232 may mean physically different connections (i.e. unidirectional connections between the TX logic and the RX logic) or same connection (i.e. bi-directional connections between the TX logic and the RX logic), where the role of the TX logic and the RX logic alternates between the two ends.

The link layers 214 and 224 ensure reliable transmission and flow control of information between the device 1 210 and the device 2 220 in one embodiment of the invention. In one embodiment of the invention, the link layers 214 and 224 have logic to implement a synchronizing mechanism between the device 1 210 and the device 2 220. The routing layers 213 and 223 provide the framework for directing packets through the fabric in one embodiment of the invention. The transport layers 212 and 222 provide advanced routing capability including, but is not limited to, end-to-end transmission of data.

The protocol layers 211 and 221 have a high-level set of rules for exchanging data packets between the device 1 210 and the device 2 220 in one embodiment of the invention. The architectural layers 200 illustrated in FIG. 2 in not meant to be limiting and one of ordinary skill in the relevant art will readily appreciate that other configuration of the architectural layers 200 can be used without affecting the workings of the invention. For example, in one embodiment of the invention, devices on either side of the communication link can have any layer arrangement as long as either one is equipped to send and receive appropriate patterns from the other. In another embodiment of the invention, the transport layers 212 and 224 are not part of the architectural layers 200. When the device 1 210 and the device 2 220 use another communication protocol, one of ordinary skill in the relevant art will also readily appreciate that how to modify the architectural layers of the other communication protocol based at least in part on the architectural layers 200 and the modifications shall not be described herein.

Figure 3:
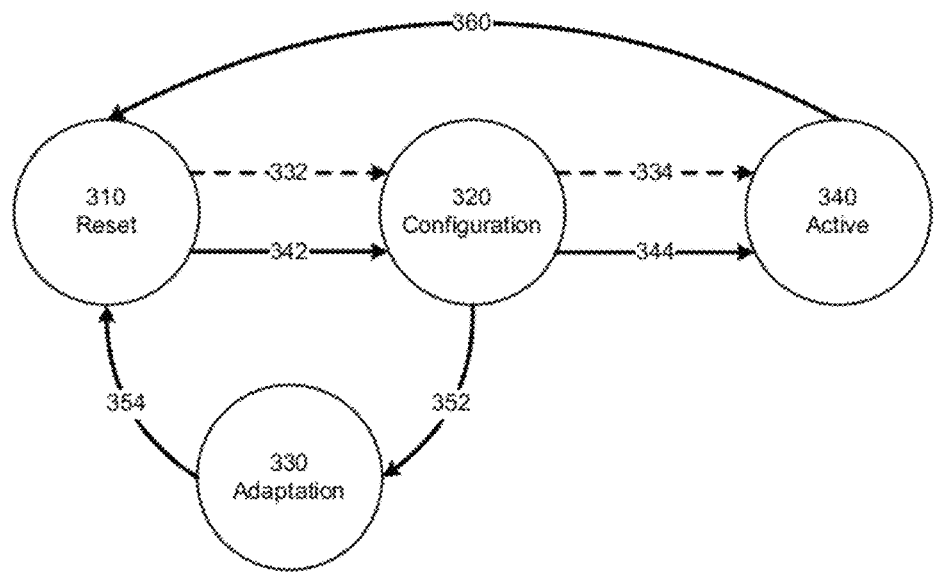
FIG. 3 illustrates a state machine in accordance with one embodiment of the invention.

FIG. 3 illustrates a state machine 300 in accordance with one embodiment of the invention. For clarity of illustration, FIG. 3 is discussed with reference to FIGS. 1 and 2. In one embodiment of the invention, the state machine 300 is implemented in the physical layers 215 and 225. In another embodiment of the invention, the state machine 300 is implemented in the links layers 214 and 224. In yet another embodiment of the invention, the state machine 300 is implemented in firmware or software or any combination thereof in the device 1 210 and the device 2 220. One of ordinary skill in the relevant art will readily appreciate that the state machine 300 can be implemented in any configuration or form in the devices or the platform without affecting the workings of the invention.

In one embodiment of the invention, a transmitting device and a receiving device in the platform 100 have logic to operate in accordance with the state machine 300. The state machine 300 facilitates a synchronization mechanism on the transmitting device and the receiving device to adapt their communication links to the link conditions on the platform. The state machine 300 has a reset state 310, a configuration state 320, an adaptation state 330 and an active state 340 in one embodiment of the invention. The adaptation of the communication links is performed at the transmitting device and/or the receiving device when both the transmitting device and the receiving device are in the adaptation state 330 in one embodiment of the invention.

In the reset state 310, a device enters a reset mode and all settings are set to their default or initial values. In one embodiment of the invention, the default or initial values of the settings of the device are programmable. For example, in one embodiment of the invention, the default settings of the device can be programmed by changing the values of the register(s) that stores the default settings of the device.

The state machine 300 has a slow mode and a normal mode of operation. In the slow mode of operation, the state machine 300 reduces the speed of the communication link between two devices when the reset state 310 goes to the configuration state 320 and when the configuration state 320 goes to the active state 340. The state transitions 332 and 334 are performed with a slower speed that the normal speed of operation in one embodiment of the invention. In the normal mode of operation, the state machine 300 does not reduce the speed of the communication link between two devices.

In one embodiment of the invention, the state machine 300 allows one or more iterations of adaptations to be performed by the transmitting device and the receiving device. In one embodiment of the invention, the transmitting device and/or the receiving device determines which communication lane(s) is required to be adapted to the link conditions of the platform 100 during the configuration state 320.

For example, in one embodiment of the invention, the transmitting device and the receiving device are initialized with default settings in the reset state 310. After completing the reset state 310, the transmitting device and the receiving device transition to the configuration state 320 and determine if any of the communication lanes between the transmitting device and the receiving device requires adaptation to the link conditions of the platform 100. The configuration state 320 may also include the detection of the transmitting device by the receiving device and vice-versa in one embodiment of the invention. The determination of the communication lane(s) to be adapted includes, but is not limited to, an evaluation of the performance of the lane and the like. In another embodiment of the invention, the communication lane(s) to be adapted can be preset and does not need any determination.

In one embodiment of the invention, the transmitting device and the receiving device are set or programmed in the configuration state 320 to enter the adaptation state 330. In one embodiment of the invention, the transmitting device and the receiving device have a register that can be set or programmed to allow entry into the adaptation state 330. One of ordinary skill in the relevant art will readily appreciate that other ways of setting the transmitting device and the receiving device into the adaptation state 330 can be used without affecting the workings of the invention.

The transmitting device and the receiving device are synchronized during the adaptation state 330 in one embodiment of the invention. The synchronization of the transmitting device with the receiving device is performed using, but is not limited to, a common clock signal, a timer, a reset signal, a software enabled setting and the like. In the adaptation state 330, one or more communication lanes of the receiving device and/or the transmitting device can be adapted to the link conditions of the platform 100.

For example, in one embodiment of the invention, when one or more communication lanes of the receiving device are determined or selected for adaptation, the transmitting device determines a data pattern to be sent to the receiving device. The data pattern is made up of one or more pseudo random binary sequences (PRBS), or a pre-determined user defined pattern, in one embodiment of the invention. The transmitting device may also adjust the transmission settings of the data pattern in one embodiment of the invention. The transmission setting includes, but is not limited to, a termination adjustment, a clock lane optimization, a duty cycle, a power level, and the like.

The transmitting device sends the data pattern with the selected transmission setting on the communication lane(s) that has been selected for adaptation. The receiving device receives the data pattern and determines or evaluates a metric for the received data pattern for each selected communication lane. The metric for the received data pattern is based on the data pattern and/or transmission settings of the transmitting device in one embodiment of the invention. The metric includes, but is not limited to, signal to noise ratio (SNR), packet error rate, and any other suitable parameter to evaluate the performance or effectiveness of the data pattern and/or transmission settings of the transmitting device.

In one embodiment of the invention, the receiving device uses the determined metric of the received data pattern to adapt the settings of the selected communication lane. In one embodiment of the invention, the receiving device changes the default settings based on the determined metric. For example, in one embodiment of the invention, the receiving device adjusts the receiver parameters such as receiver equalization, input gain based on the determined input SNR.

In one embodiment of the invention, the adaptation of the receiving device may require more than one iteration in one embodiment of the invention. When another iteration is required, the transmitting device transitions back to the reset state 310 via the state transition 360. The transmitting device resets its settings in the reset state 310 and goes to the configuration state 320 to select a second data pattern with a second transmission setting for the selected communication lane(s). The transmitting device transitions to the adaptation state 330 to send the second data pattern with the second transmission setting for the selected communication lane(s). The second data pattern is the same as the first data pattern in one embodiment of the invention. In another embodiment of the invention, the second data pattern is different from the first data pattern. The transitioning of the transmitting device between the states is facilitated either by software using a side-band channel or by a backchannel communication from the receiving device, with the software option enabled during boot-up.

The receiver receives the second data pattern and determines a metric for the received second data pattern for each selected communication lane. The receiver compares the metric for the received second data pattern with the metric for the first received second data pattern to determine which metric is better. The receiving device uses the best determined metric of the received data pattern to adapt the settings of the selected communication lane. The iteration of the adaptation of the transmitting device and receiving device can be repeated as many times as required. When the adaptation of the transmitting device and receiving device is complete, both the transmitting device and receiving device set a register that indicates the end of the adaptation in one embodiment of the invention. When the register is set, both the transmitting device and receiving device go to the reset state 310. During the reset state 310, the receiving device initializes its settings using the settings that are determined based on the adaptation.

When an adaptation of one or more communication lanes of the transmitting device is required, the state transitions in the state machine 300 are similar and the receiving device provides a feedback to the transmitting device which transmission setting has the best metric. For example, in one embodiment of the invention, after the transmitting device has sent the data patterns with different transmission settings to the receiver device, the receiver device stores an indication of the best metric in a register. The value of the register indicates which of the data patterns that are sent to the receiving device has the best metric.

In one embodiment of the invention, the transmitting device receives one or more sideband signals from the receiving device that indicates which of the data patterns has the best metric. For example, in one embodiment of the invention, the transmitting device sends five data patterns with five different transmission settings to the receiving device. The receiving device sends a numeric value using sideband signals to the transmitting device to indicate which one of the five data patterns has the best metric. For example, if the fourth data pattern with the fourth transmission setting has the best determined metric, the receiving device sends a numeric data of four to the transmitting device.

In another embodiment of the invention, the receiving device stores an indication in a register that indicates which of the received data patterns have the best metric. For example, in one embodiment of the invention, if the receiving device determines that the third data pattern received from the transmitting device has the best metric, it sets to the register with a value of three. In one embodiment of the invention, the transmitting device copies the value of the register in the receiving device into another register in the transmitting device using sideband signals. It reads the copied value to determine which transmission setting has the best metric. In one embodiment of the invention, the transmitting device sets the default transmission settings based on the indicated transmission setting that has the best metric.

The state machine 300 is not meant to be limiting and other configurations of the state machine 300 can be used without affecting the workings of the invention. For example, in another embodiment of the invention, more states can be added to the state machine 300 as required. In another embodiment of the invention, some states can be combined. For example, in one embodiment of the invention, the configuration state 320 and the adaptation state 330 are combined into one state. In dynamic adaptation, the active state 340 and the configuration state 320 could be combined, i.e. the two devices could periodically go from the active state 340 to the adaptation state 330 and then back to the active state 340 through the reset state 310 after adaptation.

Figure 4:
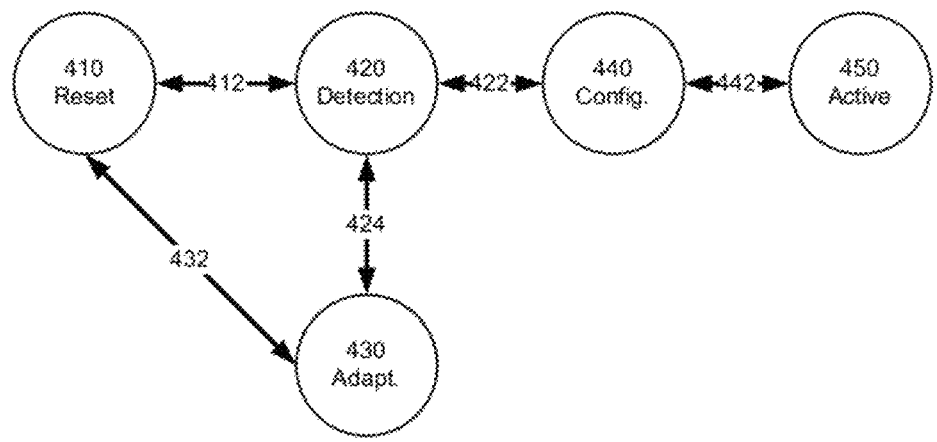
FIG. 4 illustrates a state machine in accordance with one embodiment of the invention.

FIG. 4 illustrates a state machine 400 in accordance with one embodiment of the invention that could be used for hot-plug or onlining support in platforms. In one embodiment of the invention, a transmitting device and a receiving device have logic to operate in accordance with the state machine 400. The state machine 400 facilitates a synchronization mechanism for the transmitting device and the receiving device to adapt their communication links to the link conditions on the platform. The adaptation of the communication links is performed at the transmitting device and/or the receiving device in one embodiment of the invention.

The state machine 400 has a reset state 410, a detection state 420, a adaptation state 430, a configuration state 440, and a active state 450 in one embodiment of the invention. In the reset state 410, a device enters a reset mode and all settings are set to their default or initial values.

In one embodiment of the invention, the state machine 400 facilitates an adaptation of a receiving device in one embodiment of the invention. For example, in one embodiment of the invention, in the flow of adapting a receiving device, both the transmitting device and the receiving device enter into the reset state 410. In the reset state 410, the settings of the transmitting device and the receiving device are set to their default or initial values. After the reset state 410, both the transmitting device and the receiving device enter into the detection state 420 where each device detects the presence of the other device. The detection includes, but is not limited to, determining a voltage level of one or more communication links, receiving a signal and the like.

After the transmitting device and the receiving device have detected the presence of each other, both the transmitting device and the receiving device enter into the adaptation state 430. In the adaptation state 430, transmitting device and/or the receiving device selects or determines one or more communication lanes to be adapted to the link conditions of the platform. The transmitting device applies a transmitter setting and sends a known data pattern to the receiving device via the selected communication lane(s). The receiving device receives the known (or unknown) data pattern via the selected communication lane(s) and determines or calculates a metric of the known (or unknown) data pattern.

In one embodiment of the invention, the receiving device uses the determined metric to adapt the receiver settings. For example, in one embodiment of the invention, the receiving device adjusts its receiver input parameters such as receiver equalization, input gain based on the determined input SNR of the received known data pattern. In one embodiment of the invention, the receiving device changes its default settings based on the determined metric. By changing the default settings, the receiving device is configured to the new settings that are adapted to the link conditions of the platform.

When the adaptation of the receiving device is completed, both the transmitting device and the receiving device enter into the reset state 410. The receiving device is set to the new settings that were determined during the adaptation state 430. The receiving device is set to the adapted settings each time it enters the reset state 410. After the reset state 420, both the transmitting device and the receiving device enter into the detection state 420. After the detection state 420 is completed, both the transmitting device and the receiving device enter into the configuration state 440 where both the transmitting device and the receiving device are configured. For example, in one embodiment of the invention, both the transmitting device and the receiving device operate in accordance with the QPI standard and the configuration state 440 includes, but is not limited to, a bit locking process, a byte locking process, a flit locking process and the like.

After the configuration state 440 is completed, both the transmitting device and the receiving device enter into the active state 450 where both the transmitting device and the receiving device communicates or operates using higher protocol layers and/or software. For example, in one embodiment of the invention, the link layer of both the transmitting device and the receiving device operate to establish data transfer between the two devices. In another embodiment of the invention, the pattern may be unknown i.e. the receiver could adapt without prior knowledge of the pattern.

In one embodiment of the invention, the state machine 400 facilitates an adaptation of a transmitting device in one embodiment of the invention. For example, in one embodiment of the invention, in the flow of adapting a transmitting device, both the transmitting device and the receiving device enter into the reset state 410 where the settings of the transmitting device and the receiving device are set to their default or initial values. After the reset state 410, both the transmitting device and the receiving device enter into the detection state 420 where each device detects the presence of the other device.

After the transmitting device and the receiving device have detected the presence of each other, both the transmitting device and the receiving device enter into the adaptation state 430. In the adaptation state 430, the transmitting device and/or the receiving device selects or determines one or more communication lanes to be adapted to the link conditions of the platform. The transmitting device sends a known data pattern to the receiving device via the selected communication lane(s). The receiving device receives the known data pattern via the selected communication lane(s) and determines or calculates a metric of the known data pattern.

In one embodiment of the invention, the receiving device determines the best metric among all the known data patterns sent by the transmitting device and indicates or sends the information to the transmitting device. For example, in one embodiment of the invention, the transmitting device sends five data patterns with five different transmission settings to the receiving device. The five data patterns may have the same data pattern, or all different data patterns, or any other combination thereof. After receiving each data pattern, the receiving device determines a metric of each data pattern. The receiving device determines the best metric among the five data patterns and indicates to the transmitting device which one of the five data patterns has the best metric using a back channel.

In another embodiment of the invention, the transmitting device performs the determination of the data pattern with the best metric determined by the receiving device. The receiving device determines a metric for each received data pattern and sends the metric to the transmitting device using a back channel. The transmitting device determines the best metric among the received metric of the data patterns and adapts or adjusts its transmission setting(s) based on the best metric. For example, in one embodiment of the invention, the receiving device determines the bit error rate (BER) of each received data pattern and sends the determined BER to the transmitting device. The transmitting device determines which data pattern has the lowest BER and sets its default transmission settings to the transmission settings associated with the data pattern that has the lowest BER.

After the adaptation of the transmitting device is completed, both the transmitting device and the receiving device enter into the reset state 410. In one embodiment of the invention, the settings of the transmitting device and the receiving device are set to their default or initial values during the reset state 410. In another embodiment of the invention, the settings of the transmitting device and the receiving device are maintained at their adapted values if their adaptation is completed.

The transmitting device is set to the new transmission settings that are determined during the adaptation state 430. The transmitting device is set to the adapted settings each time it enters the reset state 410. After the reset state 420, both the transmitting device and the receiving device enter into the detection state 420. After the detection state 420 is completed, both the transmitting device and the receiving device enter into the configuration state 440 where both the transmitting device and the receiving device are configured. After the configuration is completed, both the transmitting device and the receiving device enter into the active state 450 where both the transmitting device and the receiving device can communicate or operate using higher protocol layers and software.

The state machine 400 is not meant to be limiting and other configurations of the state machine 400 can be used without affecting the workings of the invention. For example, in another embodiment of the invention, more states can be added to the state machine 400 as required.

Figure 5:
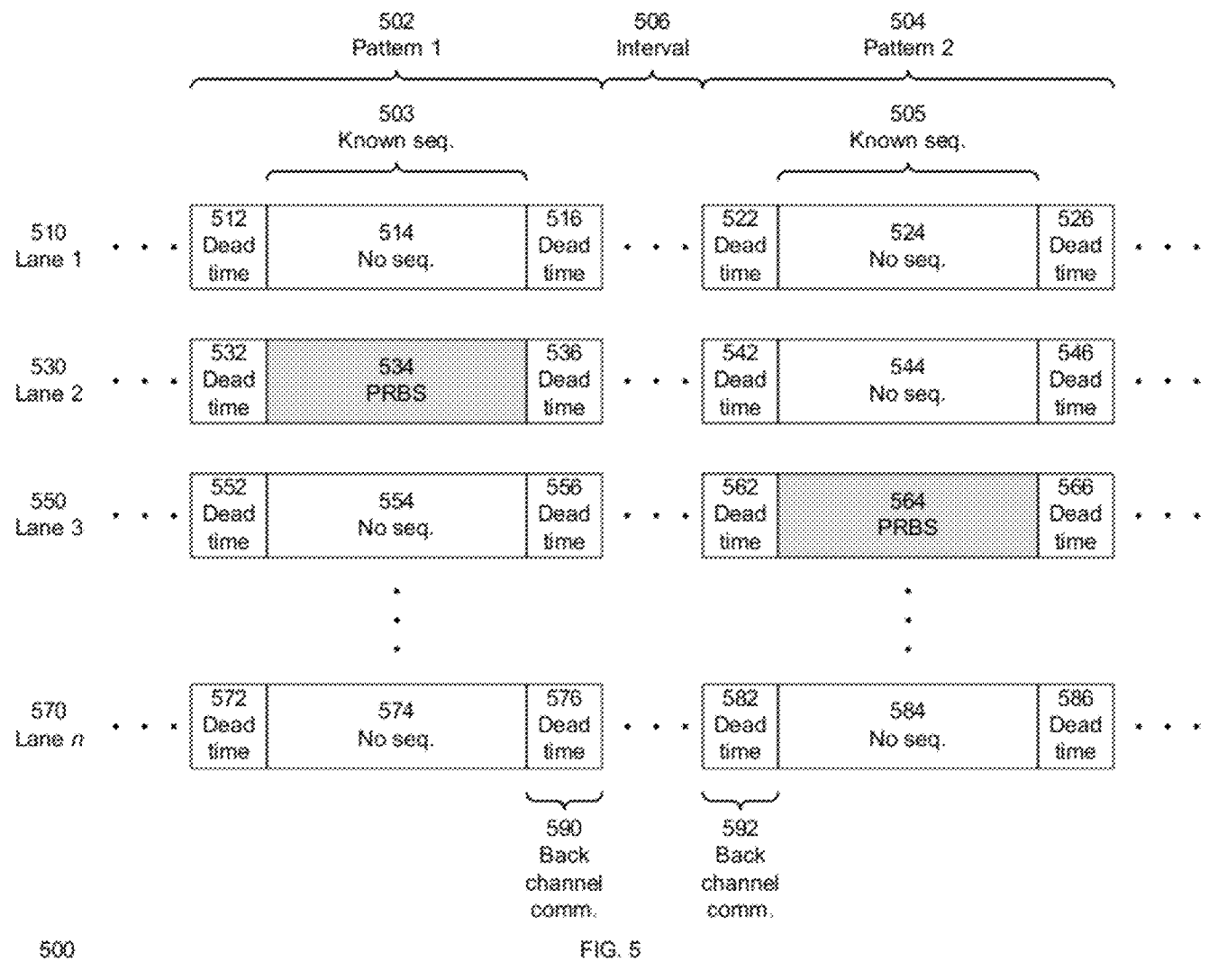

FIG. 5 illustrates a sequence 500 of an adaptation operation in accordance with one embodiment of the invention. For clarity of illustration, it is assumed as an example that there are n communication lanes between the transmitting device and the receiving device and the communication lane 2 530 and the communication lane 3 550 have been selected for adaptation to the link conditions of the platform.

In one embodiment of the invention, each data pattern that the transmitting device sends to the receiving device has a dead time or ignore time immediately before and after the data pattern. The dead time or ignore time is a period where the receiving device ignores any data transmission from the transmitting device for adaptation purposes. For example, in one embodiment of the invention, the transmitting device sends a known data pattern 1 502 to the receiving device. In the communication lane 2 530, the transmitting device uses the dead time 532 to send information to the receiving device. The information includes, but is not limited to, transmission parameters for the next data pattern.

The transmitting device sends a known sequence 503 to the receiving device. In one embodiment of the invention, the known sequence 503 is a PRBS sequence 534 created using a seed. The seed is used to generate the PRBS sequence 534 and one of ordinary skill in the relevant art will readily appreciate how to generate the PRBS sequence 534, and it shall not be described herein.

After the PRBS sequence 534 is sent, the transmitting device waits for a dead time 536. In one embodiment of the invention, the dead time 532 and 536 prevent the receiving device from reacting to any transient noise signal on the communication lane 2 530 when the transmitting device is changing its transmission settings or coefficients.

As the communication lanes 1 510, 3 550 and n 570 are not selected for adaptation during the pattern 1 502, no PRBS sequence is generated for the communication lanes 1 510, 3 550 and n 570 in one embodiment of the invention. When the receiving device receives the PRBS sequence 534 from the transmitting device, the receiving device determines a metric for the received PRBS sequence 534. In one embodiment of the invention, the receiving device indicates to the transmitting device the determined metric using a backchannel communication 590 during the dead time 536 of the pattern 1 502.

In another embodiment of the invention, the receiving device indicates to the transmitting device the determined metric using a backchannel communication 592 during the dead time 542 of the known data pattern 2 504. In yet another embodiment of the invention, the receiving device indicates to the transmitting device the best metric using a backchannel communication during the dead time of the last pattern sent by the transmitting device.

The pattern 2 504 illustrates that the transmitting device can adapt more than one communication lane in one embodiment of the invention. After an interval 506 after the pattern 1 502 is sent, the transmitting device begins to signal the receiving device during the dead time 562 and sends the PRBS sequence 564 created using a seed to the receiving device via the communication lane 3 550. After the PRBS sequence 564 is sent, the transmitting device waits for a dead time 566. As the communication lanes 1 510, 2 530 and n 570 are not selected for adaptation during the pattern 2 504, no PRBS sequence is generated for the communication lanes 1 510, 2 530 and n 570 in one embodiment of the invention. When the receiving device receives the PRBS sequence 564 from the transmitting device, the receiving device determines a metric for the received PRBS sequence 564 and indicates the metric to the transmitting device using a back channel communication.

The sequence 500 illustrates an example where the pattern 1 502 and the pattern 2 504 are sent one after the other, i.e., the patterns are staggered over a period of time. The staggering of the patterns minimizes the correlation between the patterns. However, the sequence 500 illustrated in FIG. 5 is not meant to be limiting. The transmitting device can send more than one known data pattern for each communication lane in one embodiment of the invention. For example, in another embodiment of the invention, the data patterns 1 502 and 504 are sent in parallel or during the same time frame or sequence. The transmitting device and receiving device adapt the communication lanes that are selected and each communication lane can have a different transmission or reception setting in one embodiment of the invention. The type of PRBS sequence generated by the transmitting device has a high order in one embodiment of the invention. In one embodiment of the invention, the PRBS sequence has an order of 23. This allows electrical parameters including, but are not limited to, transition edge quality, width of the eye created by the edges, height of the eye created by the edges and the like, to be tested during the adaptation. One of ordinary skill in the relevant will readily appreciate that any other pattern that tests or stresses the electrical parameters of the transmission drivers in the transmitting device and the receiver blocks in the receiving device can be used without affecting the workings of the invention.

The back channel that facilitates the communication between the transmitting device and the receiving device is implemented using, but is not limited to, sideband signaling, hardware, slow mode software and the like. In one embodiment of the invention, the transmitting device and the receiving device uses a communication protocol that is different from the communication link between the transmitting device and the receiving device as the sideband signaling. The sideband signaling uses a communication protocol that includes, but is not limited to, Joint Test Action Group (JTAG) interface, Inter-Integrated circuit communication (I2C) interface, System Management Bus (SMBus) and any other communication protocol.

For example, in one embodiment of the invention, the transmitting device and the receiving use a QPI communication protocol and the receiving device uses a JTAG interface to indicate the determined metric of the received data patterns to the transmitting device. The receiving device may use write the value of the metric into a register of the transmitting device via the JTAG interface.

In one embodiment of the invention, the back channel is implemented using firmware and/or software. The software includes, but is not limited to, basic input/output system (BIOS), unified extensible firmware interface (UEFI) and the like. The transmitting device and the receiving device have registers to store the determined metrics in one embodiment of the invention. For example, in one embodiment of the invention, the receiving device determines the metric for each receiving data pattern from the transmitting device and stores the metric in one or more registers. The platform uses software or firmware to copy the value of the registers in the receiving device to another one or more registers in the transmitting device. The transmitting device reads the metric and determines the adaptation of its transmission settings based on the metric. In one embodiment of the invention, the communication link between the transmitting device and the receiving device can be used as the backchannel by operating at a slower speed with an unadapted or partially-adapted communication link.

Figure 6:
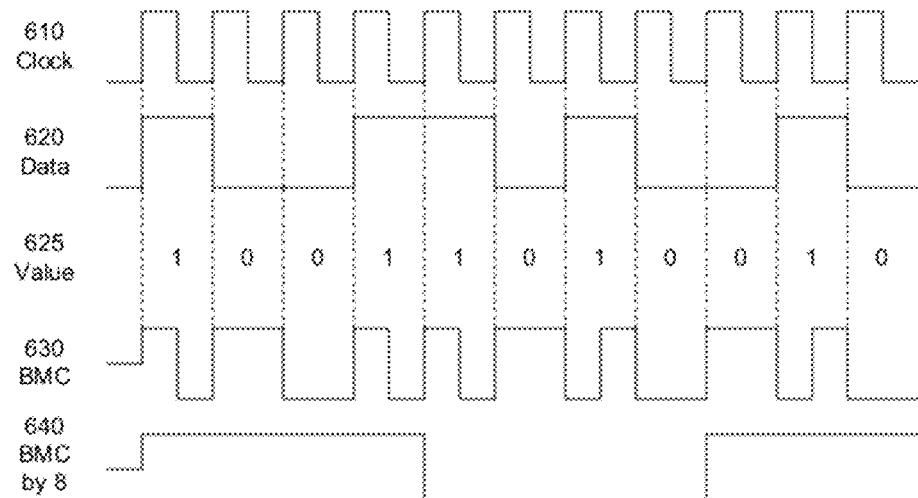
FIG. 6 illustrates a timing diagram of a coding scheme in accordance with one embodiment of the invention.

In one embodiment of the invention, the transmitting device and the receiving device has hardware logic to implement the back channel. FIG. 6 illustrates a timing diagram 600 of a coding scheme in accordance with one embodiment of the invention. The transmission uses the Bi-phase Mark Code (BMC) coding scheme to encode the data that is represented by the binary data waveform 620 and data values 625. The data is synchronized to the clock signal 610 and the BMC waveform 630 shows the encoded data using BMC coding scheme. The BMC coding scheme makes synchronization easier by ensuring that there is at least one digital transition at every bit boundary. One of ordinary skill in the relevant art will readily appreciate the workings of the BMC coding scheme and it shall not be described herein.

In one embodiment of the invention, the frequency of the BMC waveform 630 is decreased by a factor of x. The number x can be 8, 16, 32, or any suitable number. For example, in one embodiment of the invention, the frequency of the BMC waveform 630 is decreased by a factor of 8 and this is illustrated by the BMC by 8 waveform 640.

The reception of the coding scheme requires a demodulation to obtain the BMC waveform in one embodiment of the invention. The frequency modulated BMC waveform is sampled and each sampled length determines the bit value of the BMC waveform. For example, in one embodiment of the invention, when the frequency of the BMC waveform 630 is divided by a factor of 8, the frequency modulated BMC waveform is sampled every alternate two consecutive clock cycles and the guardband is set at two clock cycles. Similarly, when the frequency of the BMC waveform 630 is divided by a factor of 32, the frequency modulated BMC waveform is sampled every alternate eight consecutive clock cycles and the guardband is set at eight clock cycles.

In one embodiment of the invention, the receiving device uses the coding scheme to send the metric to the transmitting device. In one embodiment of the invention, the receiving device includes a preamble or header before the data payload that indicates the metric. The preamble or header allows the transmitting device to identify the presence of the metric. It also allows the sampler of the receiving device to be activated and estimates the bit boundaries of the frequency modulated BMC waveform.

The coding scheme illustrated in FIG. 6 is not meant to be limited and one of ordinary skill in the relevant will readily appreciate that other forms of coding schemes can be used without affecting the workings of the invention.

Figure 7:
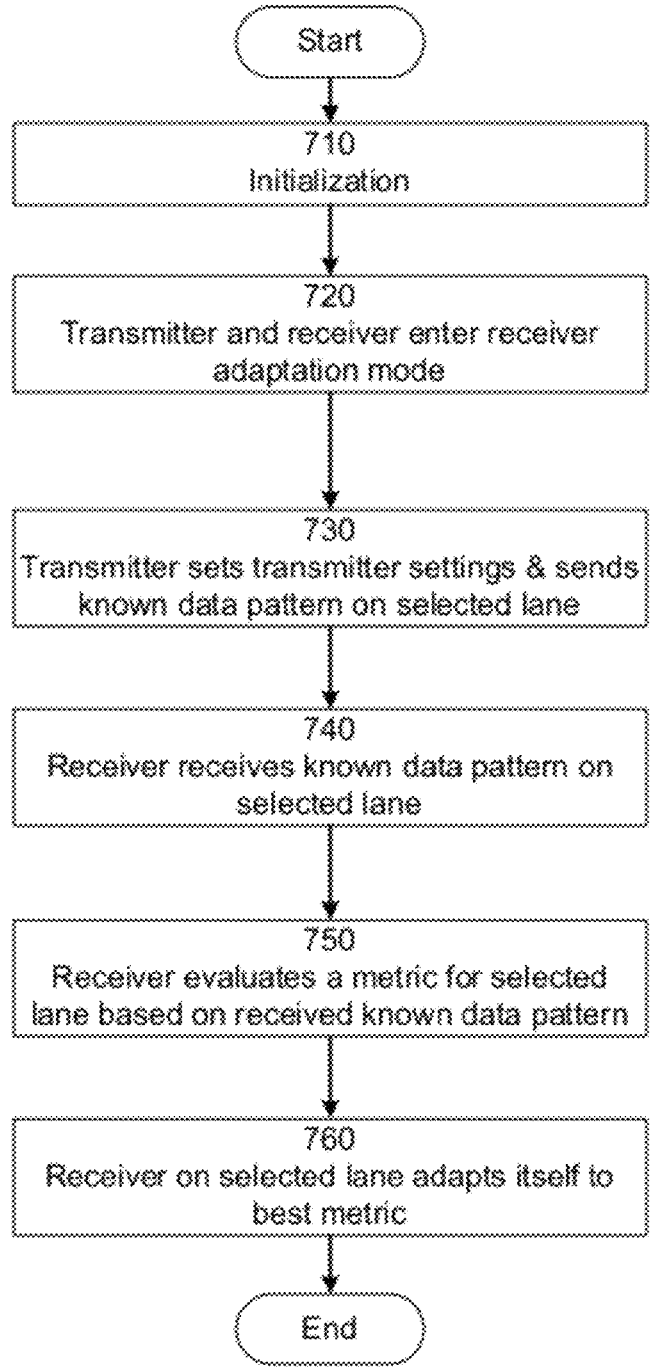
FIG. 7 illustrates a flowchart of an adaptation of a receiving device in accordance with one embodiment of the invention.

FIG. 7 illustrates a flowchart 700 of an adaptation of a receiving device in accordance with one embodiment of the invention. For clarity of illustration, FIG. 7 is discussed with reference to FIGS. 1, 3 and 4. The device 1 110 is assumed to be a transmitting device an example and the device 2 120 is assumed to be a receiving device.

In step 710, the transmitter and the receiver enter into an initialization state. In one embodiment of the invention, the transmitter and the receiver enter into the reset state 310 in step 710. In another embodiment of the invention, the transmitter and the receiver enter into the reset state 410 in step 710. In step 720, the transmitter and the receiver enter into a receiver adaptation mode. In one embodiment of the invention, the transmitter and the receiver enter into the receiver adaptation mode by entering into the adaptation state 330. In another embodiment of the invention, the transmitter and the receiver enter into the receiver adaptation mode by entering into the adaptation state 430.

In step 730, the transmitter sets the transmission settings and sends a known data pattern on a selected communication lane that is selected for adaptation. In step 740, the receiver receives the known data pattern on the selected communication lane. In step 750, the receiver evaluates a metric for the selected communication lane based at least in part on the received known data pattern. In step 760, the receiver on the selected communication lane adapts itself to the best metric and the flow 700 ends.

Figure 8:
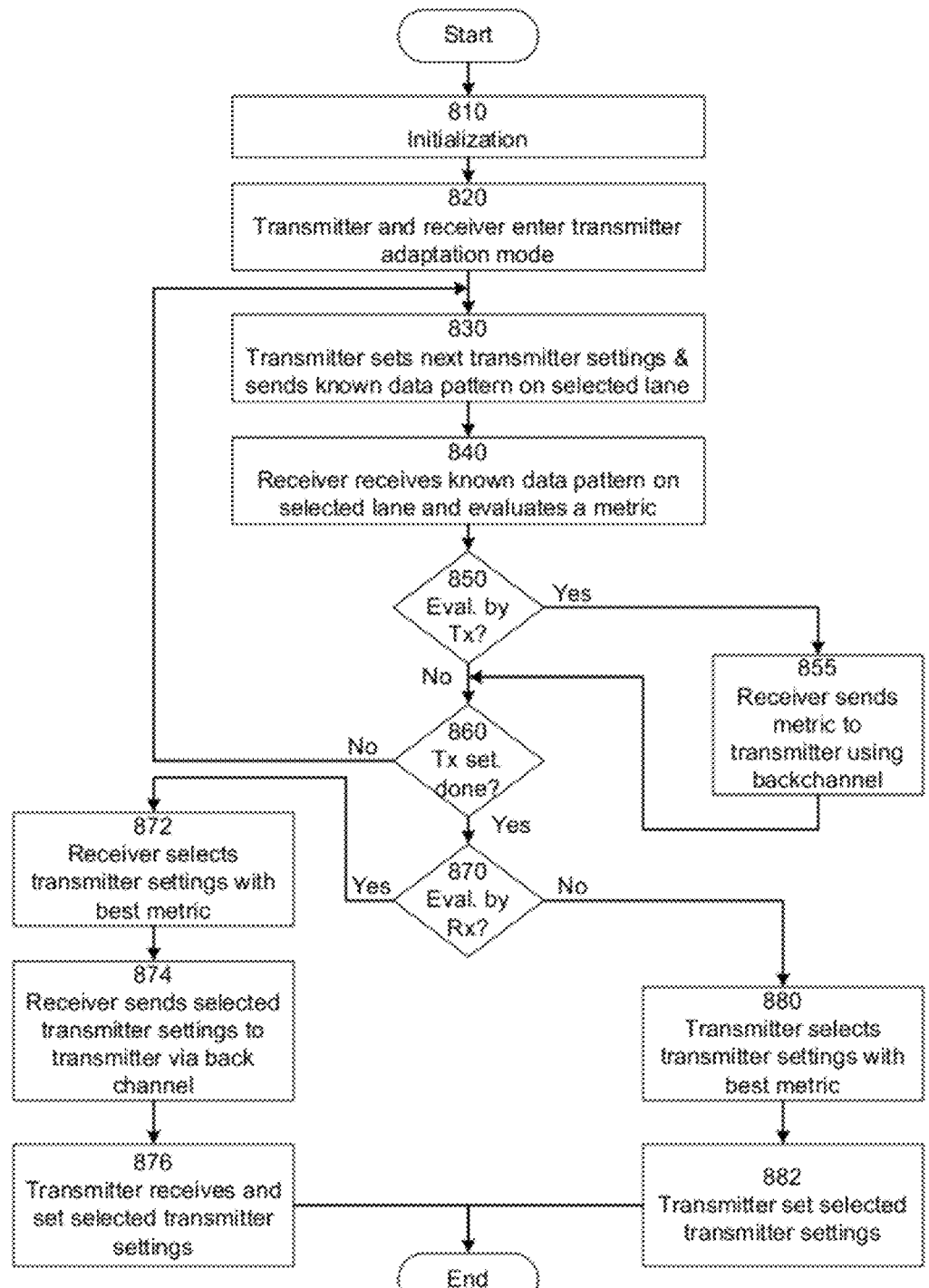
FIG. 8 illustrates a flowchart of an adaptation of a transmitting device in accordance with one embodiment of the invention.

FIG. 8 illustrates a flowchart 800 of an adaptation of a transmitting device in accordance with one embodiment of the invention. For clarity of illustration, FIG. 8 is discussed with reference to FIGS. 1, 3 and 4. The device 1 110 is assumed to be a transmitting device or transmitter as an example and the device 2 120 is assumed to be a receiving device or receiver.

In step 810, the transmitting device and the receiving device enter into an initialization state. In one embodiment of the invention, the transmitting device and the receiving device enter into the reset state 310 in step 810. In another embodiment of the invention, the transmitting device and the receiving device enter into the reset state 410 in step 810. In step 820, the transmitting device and the receiving device enter into a transmitter adaptation mode. In one embodiment of the invention, the transmitting device and the receiving device enter into the transmitter adaptation mode by entering into the adaptation state 330. In another embodiment of the invention, the transmitting device and the receiving device enter into the transmitter adaptation mode by entering into the adaptation state 430.

In step 830, the transmitting device sets the next transmission settings and sends a known data pattern on a selected communication lane that is selected for adaptation. In step 840, the receiving device receives the known data pattern on the selected communication lane. In step 850, the flow 800 determines if the transmitting device performs the evaluation of the metric determined by receiving device. If so, the receiving device sends the determined metric to the transmitting device using the back channel in step 855 and the flow goes to step 860. If no, the flow goes to step 860 and checks if all the transmission settings for adaptation are done. If no, the flow 800 goes to step 830. If yes, the flow 800 goes to step 870 to determine if the receiving device performs the evaluation of the metric determined by the receiving device.

If yes, the flow 800 goes to step 872 and the receiving device selects the transmitting device setting with the best metric. In step 874, the receiving device sends the selected transmitting device settings to the transmitting device via a back channel. In step 876, the transmitting device receives the selected transmitting device setting and sets the selected communication lane based on the transmission settings with the best metric and the flow 800 ends.

If the receiving device does not perform the evaluation of the metric determined by the receiving device in step 870, the flow 800 goes to step 880 and the transmitting device selects the transmitting device setting with the best metric. In step 882, the transmitting device set the selected transmitting device settings as the default transmission settings and the flow 800 ends.

Figure 9:
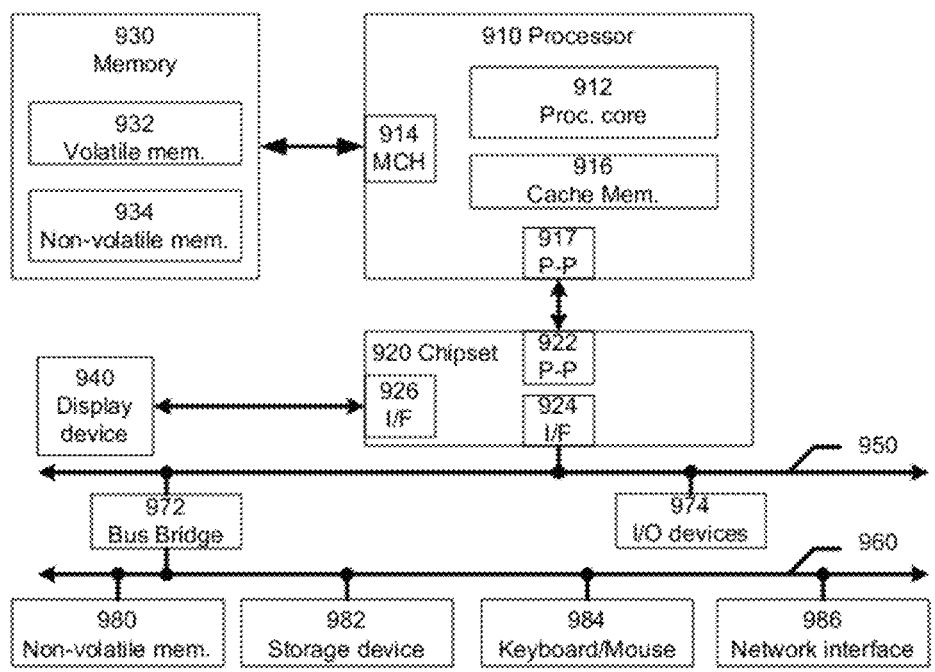
FIG. 9 illustrates a system to implement the methods disclosed herein in accordance with one embodiment of the invention.

FIG. 9 illustrates a system 900 to implement the methods disclosed herein in accordance with one embodiment of the invention. The system 900 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 900 used to implement the methods disclosed herein may be a system on a chip (SOC) system or system in package (SIP) system.

The processor 910 has a processing core 912 to execute instructions of the system 900. The processing core 912 includes, but is not limited to, pre-fetch logic to fetch instructions, decode logic to decode the instructions, execution logic to execute instructions and the like. The processor 910 has a cache memory 916 to cache instructions and/or data of the system 900. In another embodiment of the invention, the cache memory 916 includes, but is not limited to, level one, level two and level three, cache memory or any other configuration of the cache memory within the processor 910.

The memory control hub (MCH) 914 performs functions that enable the processor 910 to access and communicate with a memory 930 that includes a volatile memory 932 and/or a non-volatile memory 934. The volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 934 includes, but is not limited to, NAND flash memory, phase change memory (PCM), read only memory (ROM), electrically erasable programmable read only memory (EEPROM), or any other type of non-volatile memory device.

The memory 930 stores information and instructions to be executed by the processor 910. The memory 930 may also stores temporary variables or other intermediate information while the processor 910 is executing instructions. The chipset 920 connects with the processor 910 via Point-to-Point (PtP)

interfaces 917 and 922. The chipset 920 enables the processor 910 to connect to other modules in the system 900. In one embodiment of the invention, the interfaces 917 and 922 operate in accordance with a PtP communication protocol such as the Intel® QuickPath Interconnect (QPI) or the like. The chipset 920 connects to a display device 940 that includes, but is not limited to, liquid crystal display (LCD), cathode ray tube (CRT) display, or any form of visual display device.

In addition, the chipset 920 connects to one or more buses 950 and 960 that interconnect the various modules 974, 980, 982, 984, and 986. Buses 950 and 960 may be interconnected together via a bus bridge 972 if there is a mismatch in bus speed or communication protocol. The chipset 920 couples with, but is not limited to, a non-volatile memory 980, a mass storage device(s) 982, a keyboard/mouse 984 and a network interface 986. The mass storage device 982 includes, but is not limited to, a solid state drive, a hard disk drive, an universal serial bus flash memory drive, or any other form of computer data storage medium. The network interface 986 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. For example, although the cache memory 916 is depicted as a separate block within the processor 910, the cache memory 916 can be incorporated into the processor core 912 respectively. The system 900 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
logic to adapt one or more settings of one or more serial communication links with a transmitter based at least in part on a metric of received data patterns from the one or more serial communication links, wherein the received data patterns comprise one or more of a pseudo random binary sequence (PRBS) and a pre-determined user defined pattern, and wherein the logic is to determine a metric of the received data patterns from the respective one or more serial communication links based on one or more of a voltage margin, a timing margin, or a power dissipation, of the respective one or more serial communication links, and indicate to the transmitter the metric of the received data patterns using a back channel.

2. The apparatus of claim 1, wherein the logic to adapt the one or more settings of the one or more serial communication links with the transmitter is to operate the one or more serial communication links with a slower transmission rate than a normal transmission rate, wherein the normal transmission rate is the initial transmission rate of the one or more serial communication links.

3. The apparatus of claim 1, wherein the back channel comprises one or more of sideband signals.

4. The apparatus of claim 1, wherein the logic to indicate to the transmitter the metric of the received data patterns using the back channel is to copy a value of a register in the apparatus to another register in the transmitter, wherein the value of the register comprises the metric of the received data patterns.

5. The apparatus of claim 1, wherein the one or more serial communication links operate in accordance with QuickPath Interconnect (QPI), Peripheral Component Interconnect Express (PCIe), and Scalable Memory Interconnect (SMI).

6. The apparatus of claim 1, wherein the one or more settings comprise one or more of a termination adjustment, a clock lane optimization, cross-talk, an equalizer setting, jitter setting, a signal attenuation, a reflective effect, a signal propagation delay, a duty cycle, and a power level.

7. An apparatus comprising:
logic to:
send one or more data streams to a receiver using a serial communication link, wherein the one or more data streams are to be sent with one or more transmission settings, and wherein each of the one or more data streams comprises one or more of a pseudo random binary sequence (PRBS) and a pre-determined user defined pattern; and receive an indication of which one of the respective one or more transmission settings has a determined metric by the receiver, wherein the logic to receive the indication of which one of the one or more transmission settings has the determined metric by the receiver is to receive one or more sideband signals that indicate which one of the respective one or more transmission settings has the determined metric by the receiver.

8. The apparatus of claim 7, wherein the logic is further to set the indicated transmission setting as a transmission setting of the serial communication link.

9. The apparatus of claim 7, wherein the logic to receive the indication of which one of the one or more transmission settings has the determined metric by the receiver is to read a register having a value of the one transmission setting with the determined metric.

10. The apparatus of claim 7, wherein each of the one or more data streams has a quiescent period immediately before and after each data stream, and wherein the logic to receive the indication of which one of the one or more transmission settings has the determined metric by the receiver is to receive the indication of which one of the one or more transmission settings has the determined metric by the receiver during the quiescent period.

11. The apparatus of claim 7, wherein the logic to send the one or more data streams to the receiver using the serial communication link is to send the one or more data streams to the receiver using the serial communication link with a transmission rate slower than a normal transmission rate, wherein the normal transmission rate is the initial transmission rate of the one or more data streams.

12. The apparatus of claim 7, wherein the serial communication link operates in accordance with QuickPath Interconnect (QPI), Peripheral Component Interconnect Express (PCIe), and Scalable Memory Interconnect (SMI).

13. The apparatus of claim 7, wherein the respective one or more transmission settings comprise one or more of a termination adjustment, a clock lane optimization, cross-talk, an equalizer setting, jitter setting, a signal attenuation, a reflective effect, a signal propagation delay, a duty cycle, and a power level.

14. The apparatus of claim 7, wherein the determined metric is based on one or more of a voltage margin, a timing margin, a power dissipation, of the serial communication link.

15. A method comprising:
selecting one or more of a plurality of communication lanes between a transmitting device and a receiving device;
determining a metric of a received data pattern received from the selected one or more communication lanes; and
indicating the determined metric to the transmitting device using a back channel.

16. The method of claim 15, further comprising:
adapting one or more settings of the receiving device based at least in part on the determined metric.

17. The method of claim 15, wherein the transmitting device and the receiving device are to use a communication protocol, and wherein the back channel comprises another communication protocol to be used by the receiving device to indicate the determined metric to the transmitting device.

18. The method of claim 15, further comprising:
encoding the determined metric using a Bi-phase Mark Code (BMC) scheme;
frequency modulating the encoded determined metric; and
sending the frequency modulated metric using a back channel.

19. The method of claim 15, further comprising:
adding a preamble to the encoded determined metric.

20. The method of claim 15, where the transmitting device and the receiving device is to operate in accordance at least in part with one of QuickPath Interconnect (QPI), Peripheral Component Interconnect Express (PCIe), and Scalable Memory Interconnect (SMI).

* * * * *